United States Patent [19]

Rugg et al.

[11] 4,316,748

[45] Feb. 23, 1982

[54] PROCESS FOR THE ACID HYDROLYSIS OF WASTE CELLULOSE TO GLUCOSE

[75] Inventors: Barry A. Rugg, New York; Robert Stanton, New Hyde Park, both of N.Y.

[73] Assignee: New York University, New York, N.Y.

[21] Appl. No.: 131,339

[22] Filed: Mar. 18, 1980

[51] Int. Cl.[3] .......... C13K 1/06; B01J 3/03

[52] U.S. Cl. .......... 127/37; 127/1; 127/28

[58] Field of Search .......... 127/1, 37, 28; 422/137; 366/83, 85, 88; 162/56, 236

[56] References Cited

U.S. PATENT DOCUMENTS

| | | | |
|---|---|---|---|
| 3,382,536 | 5/1968 | Fritsch et al. | 366/85 |
| 3,917,507 | 11/1975 | Skidmore | 162/56 |
| 4,088,528 | 5/1978 | Berger et al. | 762/236 |
| 4,201,596 | 5/1980 | Church et al. | 127/37 |
| 4,214,947 | 7/1980 | Berger | 162/56 |

FOREIGN PATENT DOCUMENTS

| | | | |
|---|---|---|---|
| 633586 | 11/1978 | U.S.S.R. | 127/1 |
| 682491 | 8/1979 | U.S.S.R. | 127/1 |

*Primary Examiner*—Michael S. Marcus

*Attorney, Agent, or Firm*—Sprung, Felfe, Horn, Lynch & Kramer

[57] ABSTRACT

A process and apparatus for the acid hydrolysis of waste cellulose to glucose of the type wherein waste cellulose is continuously fed into an inlet port of a twin screw extruder, water is continuously fed into reaction zone in the extruder downstream of the inlet port, the cellulose is continuously reacted with water in the presence of an acid catalyst at elevated temperature and pressure in the reaction zone while continuously conveying same to an outlet port of the extruder and the reacted cellulose is discharged from the extruder the elevated temperature and pressure in the reaction zone is maintained, has the elevated pressure is maintained by forming a dynamic seal zone at the upstream end of the reaction zone by providing an unthreaded and radially recessed discontinuity in the screws.

6 Claims, 7 Drawing Figures

PROCESS FOR THE ACID HYDROLYSIS OF WASTE CELLULOSE TO GLUCOSE

BACKGROUND OF THE INVENTION

The invention described herein was made in the course of work under U.S. Environmental Protection Agency Grant No. R 805,239 and is subject to an exclusive license left to the grantee, New York University of New York, N.Y.

The present invention relates to a process and an apparatus for the continuous chemical conversion of materials, in particular to a process and an apparatus for the conversion of waste cellulose to glucose by acid hydrolyzation and more particularly to an improvement in the process and apparatus disclosed in copending U.S. application Ser. No. 131,340 filed on the same day as this application.

Acid hydrolysis of cellulose has been extensively studied for the better part of the century, particularly in connection with the manufacturing from ethanol from wood wastes. It has long been known that cellulose can be hydrolyzed in acid solutions and converted to its monomer, glucose, and the reaction has been experimentally investigated since this discovery. The reaction results from the fact that the monomers of cellulose are anhydroglucose units, and that during hydrolyzation, a water molecule is added to the cellulose monomer unit to obtain the heavier molecular weight glucose.

Recently, there has been a growing interest in the utilization of waste cellulose for energy production, because of the possibility of producing ethyl alcohol from glucose, and for the purposes of materials recovery.

While the acid hydrolysis of cellulose is heterogeneous, it can be regarded as a homogeneous reaction, provided that the cellulose reactant is dispersed in the form of fine particles, i.e., 200-mesh or less. The kinetically predicted sugar yields assume that the cellulose reactant has appropriate chemical reactivity for the acid hydrolysis. The technical problems of cellulose hydrolysis are to a great extend due to the fact that this is not the case. The lack of an adequate amount of chemical reactivity in cellulose is called lack of accessibility. This is related to the highly inert character and crystalline organization on a molecular level of the high molecular weight cellulose, and also the presence of lignin. Hydrogen-bonding almost certainly plays a very important role in the structure of cellulose, and may be a key factor in explaining its chemical inertness.

In general, mechanical treatments, such as, for example, intensive ball milling to sizes below 60 mesh, have been found to be technically effective, but at a high cost which renders any process economically prohibitive. Treatment with high-energy ionizing radiation on the order of 100 megarads has been shown to be effective, however the cost of such large doses of ionizing radiation is too high for industrial usage.

While heretofore successful batch-wise production of glucose from cellulose has been carried out by the acid hydrolysis of waste cellulose, this type of process and the apparatus for carrying it out are insufficient for commercial production.

The aforementioned copending U.S. application Ser. No. 131,340 teaches a process and apparatus for the quasi-continuous conversion of fibrous material to a derivative thereof and in particular for the quasi-continuous acid hydrolysis of cellulose to glucose, based upon the use of a hydrolysis reactor which is capable of feeding, conveying and discharging hydrolysable cellulosic materials continuously while maintaining appropriate temperatures and/or pressures in the reaction zone thereof.

According to that disclosure the hydrolysis reactor is a Werner and Pfleiderer ZDS-K 53 (53 mm) corotational two screw extruder which was selected because of its capacity for conveying, mixing and extruding the required amounts of cellulosic feedstock. The extruder allows accurate control of temperature, pressure, residence time, etc. The extruder has the working elements of intermeshing twin screws which eliminate material buildup in the processing section and make feasible close control of residence time, etc., with intensive mixing.

For the quasi-continuous processing of materials, the reactor was coupled with an appropriate feeding mechanism for cellulose slurries and a discharge system for reacted material while maintaining the pressure and/or temperature in the reaction zone. In particular, the feeding means included a steam jacketed crammer feeder also produced by the Werner & Pfleiderer Corp.

In order to maintain the pressure in the reaction zone during the process, pressure is maintained at the inlet to prevent egress of the material through the crammer feeder by a dynamic seal in the form of a densified plug of material within the inlet zone of the reactor. Simultaneously, quasi continuous discharge of the hydrolyzed material was accomplished while maintaining the pressure by the use of a discharge system comprising a hydraulically powered activator and a ball valve, in particular the Kamyr Intensive Service 2" ball valve.

The dynamic seal was achieved by the formation of a dynamic plug zone in the extruder, at the inlet end of the reaction zone. The dynamic seal was formed in the conventional manner, by utilizing a left handed screw thread in the dynamic seal zone with right handed threads disposed downstream and upstream thereof.

SUMMARY OF THE INVENTION

The main object of the present invention to improve the above mentioned process and apparatus by effecting the dynamic seal by a plug formed by an unthreaded and radially recessed portion of the screws in the dynamic plug zone.

Another object of the present invention is to obtain a continuous discharge of the extruder by use of the continuously open valve which is continuously open in response to a preselected pressure in the reaction zone.

A further object is to provide a process and apparatus capable of handing both wet and dry fixed inputs.

These and other objects of the present invention will become apparent from the detailed description of the invention when read with the attached drawings wherein:

DETAILED DESCRIPTION OF THE INVENTION

Figure 1:
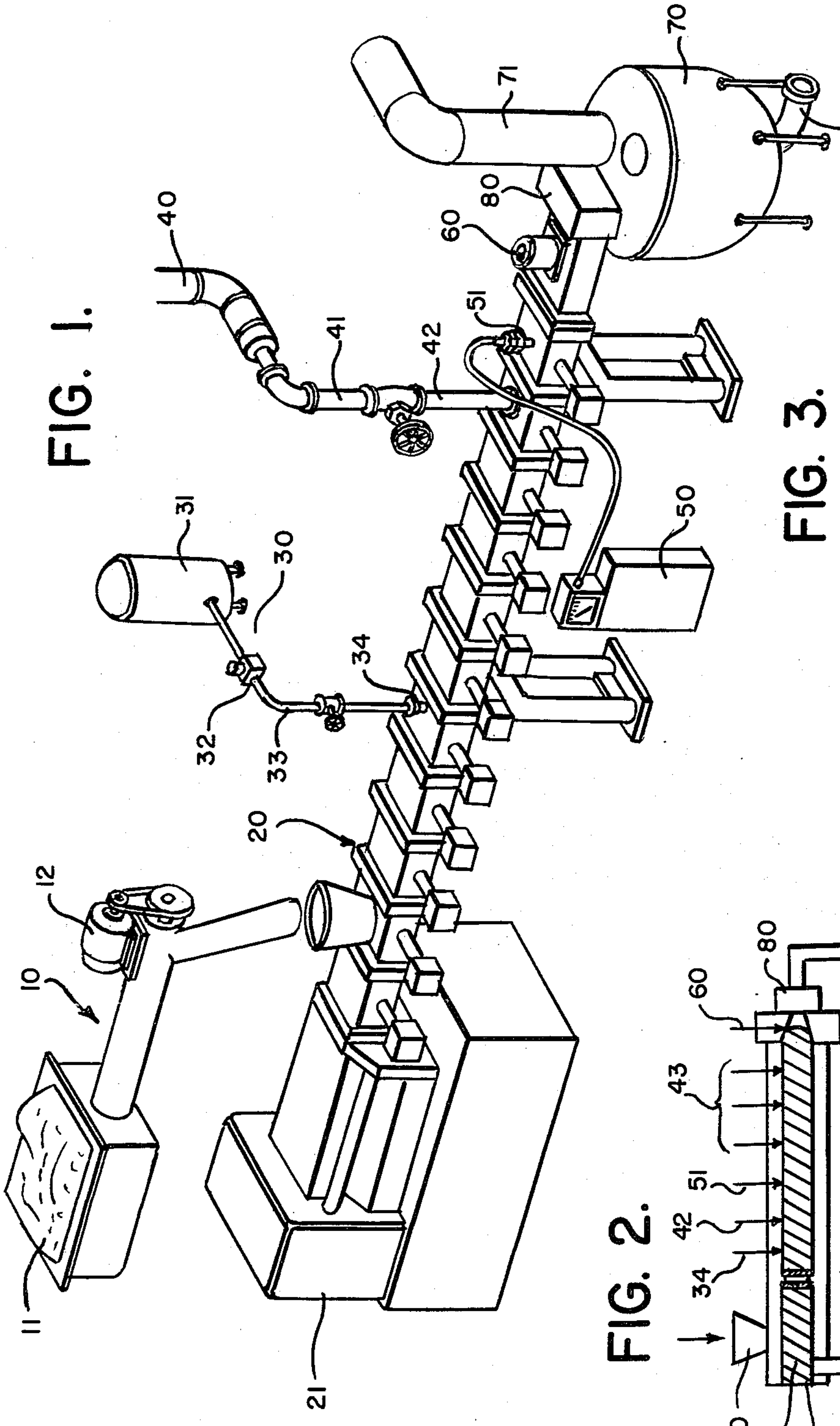
FIG. 1 is a perspective view of the apparatus according to the present invention.
Figure 2:
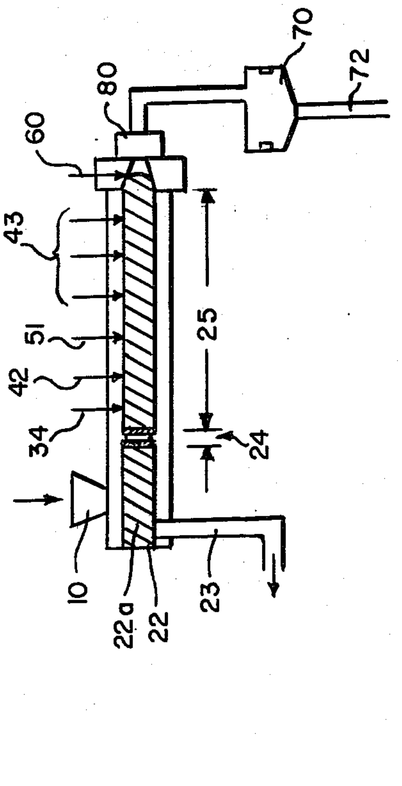
FIG. 2 is a sectional schematic view of the apparatus according to the present invention.

FIG. 1 shows the basic apparatus for carrying out the process according to the present invention. The apparatus includes the Werner and Pfleiderer ZDS-K 53 twin screw extruder 20 having two corotational screws therein driven by a motor 21. The housing 20*a* includes a feed inlet in which the material to be converted is received. As shown in FIG. 1, in accordance with the present invention dry solid fibrous material in the form of shredded paper, sawdust, etc. is fed into the extruder 20 by means of a screw feeder 10, which as shown in FIG. 2, continuously feeds the material into the extruder to be conveyed thereby.

While in conjunction with the present invention, the input of the dry fibrous material is illustrated, the material, in particular cellulose paper pulp or sawdust can be fed-in in a slurry form in an alternative form of the invention as is explained in copending U.S. application Ser. No. 131,340 filed on the same day as this application.

The extruder 20 includes a reaction zone 25 which is bounded on its inlet side by a dynamic seal zone 24 and a discharge valve 80 at its outlet side. Upstream of the reaction zone is the inlet portion or preheating zone 22*a* of twin screws 22 wherein the fibrous input is first received and thereby conveyed into the reaction zone.

In accordance with the process of the present invention, when the fibrous material is received in a slurry, much of the water thereof is removed in the process of the conveyance of the slurry into the reaction zone and for this purpose a dewatering drain 23 is provided upstream of the dynamic seal. Where the fibrous material is fed in dry form, the dewatering drain is not necessary since the liquid added thereto is just sufficient to act as a carrier or, in the case of hydrolysis to act as the reactant and therefore no water is lost as in the case of a slurry input. Water is added, as needed, in the preheating zone and which the acid through input port 34.

The apparatus further includes means 30 for adding an acid catalyst comprising a tank 31 and a metering pump 32 which feeds the acid along pipe 33 into the acid input port 34 for the extruder housing. The acid catalyst input port 34 is shown to be at the beginning of the reaction zone 25 so that the acid acts on the reactants during substantially the entire residence time of the reactants in the reaction zone. However, the input position of the acid catalyst port 34 can be varied, depending upon the temperature in the reaction zone. At higher temperatures, the reaction will generally take place faster and thus the acid can be introduced into the reaction zone at a position closer to the outlet thereof.

In the case of the hydrolysis of cellulose to glucose, it is especially advantageous for the reaction to take place at elevated temperatures and in order to bring this about in the most advantageous manner, steam is added to add energy to the reaction zone to obtain a quick increase in temperature. For this, steam supply means 40 are provided including steam pipe 41 and steam input port 42. The steam may also be used as a supply of water for the hydrolysis cellulose upon its condensation in the reaction zone.

Also provided along the extruder housing is a pressure indicator port 51 which in conjunction with pressure indicator means 50 enables a monitoring of the elevated pressure within the reaction zone. Moreover, temperature input ports 43 are also provided to enable monitoring of the temperature within the various zones of the extruder assembly. These zones are set forth in FIG. 3 as zones 1-4 and show a typical thermal configuration of the apparatus during use.

Further, at the outlet end of the reaction zone 25, a pressure release valve 60 is provided to provide pressure relief when the pressure within the reaction zone exceeds acceptable limits.

The continuous discharge of the reactants from the extruder is effected by the discharge valve means 80 which discharges the reactants into the collection vessel 70 which has a gas vent 71 and a flushing drain 72.

Figure 4:
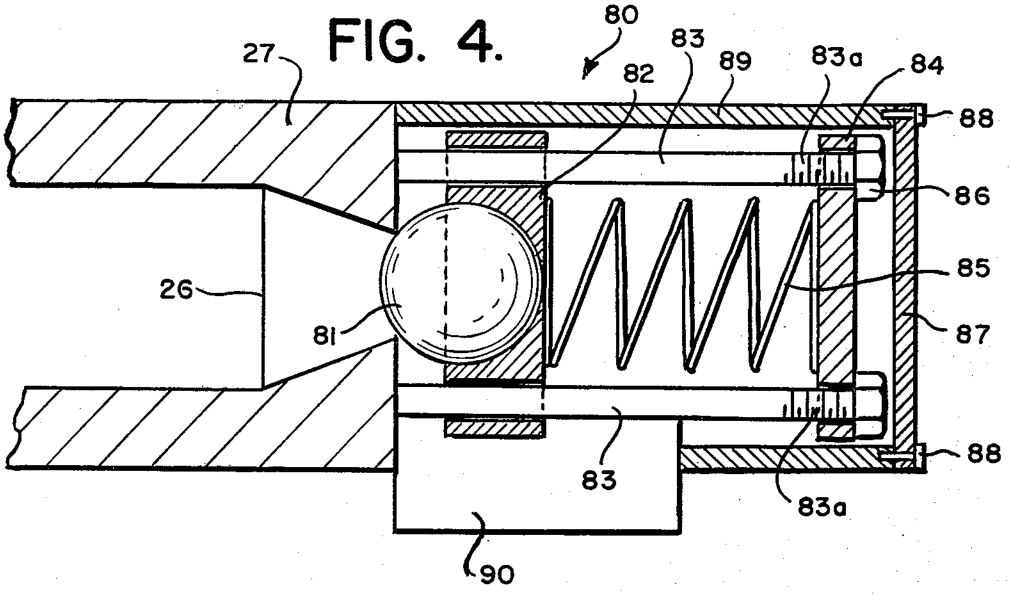
FIGS. 4 and 5 are sectional views of the discharge valve according to the present invention.
Figure 5:
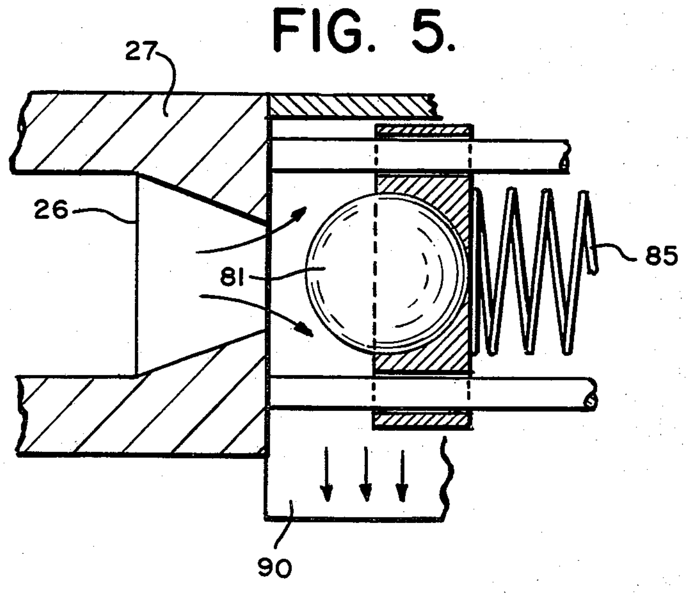

Turning now to FIGS. 4 and 5, the valving means 80 of the present invention for effecting a continuous discharge of the reactants in response to a predetermined pressure in the reaction zone 25 is illustrated. The valving means 80 comprises a spherical valve body 81 which coacts with the flanged end of the extruder housing 27 having the valve aperture 26 therein. The spherical valve body 81 is preferably a 2" valve body.

The valve body 81 is seated in a valve plate 82 which has means including spring 85 acting thereon to bias the valve body 81 into the closed position shown in FIG. 4. The biasing is carried out by the use of four screws 83 which are fixed at one end into the flange portion 27 and have threaded portions 83*a* at the other end thereof. Fitted onto the threaded portions 83*a*, is plate 84 which is prevented from moving to the right in FIG. 4 by nuts 86 which are threadably engaged with the threaded portions 83*a*. The valve assembly is sealed by the plate 87 which is screwed by screws 88 onto the housing 89 so that the only outlet of the discharge material through aperture 26 is through the outlet 90.

In use, when the pressure within the reaction zone 25 exceeds the force exerted on the valve body 81 by the spring 85, the valve body 81 is moved to the right as shown in FIG. 5 and the discharge passes through the aperture 26 and through the outlet 90. In a working apparatus, the pressure within the reaction zone will be continuously maintained so that after the initialization of the process, the valve body 81 will remain in the open position and the discharge will continually pass through valving means 80.

The pressure at which the valving means 80 will respond to be maintained in the continuously open position shown in FIG. 5, can be preset by use of the aforementioned nuts 86 which engage with the threaded portions 83*a*. In order to increase the selected pressure, the nuts 86 are turned clockwise to move the plate 84 to the left thereby increasing the force that the spring 85 exerts on the plate 82 and thereby the valve body 81. Accordingly, the pressure can be decreased by reversing the above-mentioned process.

Figure 6:
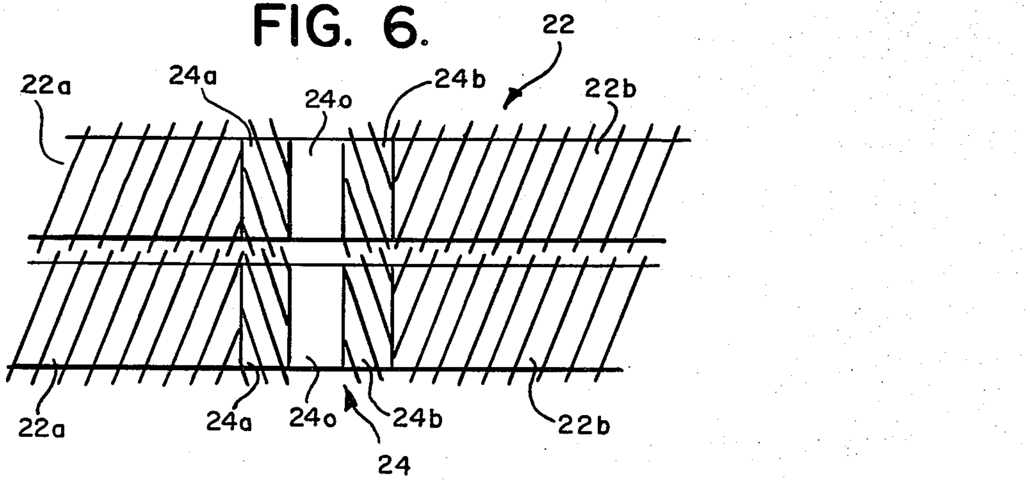
FIG. 6 is a schematic representation of the means forming the dynamic seal according to the present invention.

FIG. 6 discloses in greater detail the means forming the dynamic seal zone 24 according to the present invention. As shown in FIG. 6, the dynamic seal zone 24 is formed by the use of a radially recessed unthreaded screw section 240 on each screw with optional left handed screw sections 24*a* upstream thereof and 24*b* downstream thereof. The unthreaded radially recessed portions 240 with the optionally left handed screw thread portions 24*a*, 24*b*, when taken in conjunction with the right hand screw threaded portions 22*a* upstream thereof and 22b downstream thereof act to produce the dynamic plug which seals the reaction zone and prevents gases from escaping through the input, while enabling the fed in material to be conveyed thereby into the reaction zone.

The dynamic seal, in conjunction with the valve means 80, maintains the elevated pressure and, where desirable, the elevated temperature in the reaction zone while enabling the screw elements to convey the fed in material into the reaction zone and out of the reaction zone and to enable the reaction process to take place therein.

An example of the process and apparatus of the present invention with respect to the conversion of cellulose to glucose is set forth hereinafter as follows:

EXAMPLE

Feed Material: sawdust

Screw Feeder Feed Rate: 150 pounds per hour dry

Reaction Temperature 450° F.

Reaction Pressure 423 psi

Acid Sulfuric Acid 1.0% by weight introduced in at 120 pounds per hour in solution.

Water input: 30 pounds per hour into preheating zone.

Machine Screw RP, 300 RPM drive torque 85%.

Glucose conversion: 50% based on available cellulose

Reaction zone input: 150 pounds per hour solid, 30 pounds per hour water, 120 pounds per hour acid solution.

Product output: 50% solids including 50 pounds per hour glucose, 33 pounds per hour cellulose, 38 pounds per hour lignin, 24 pounds per hour hemi cellulose or decomposed products, 143 pounds per hour water, 12 lb. acid.

Screw configuration: total length 2250 mm preplug feed zone 630 mm of 30 mm pitch elements conveying material, 30 mm forward per revolution.

Plug zone: 90 mm long with two 30 mm 90 mm left hand pitch elements and a 30 mm unthreaded element therebetween.

Reaction zone 1590 mm long with 45 mm pitch stainless steel elements.

Figure 3:
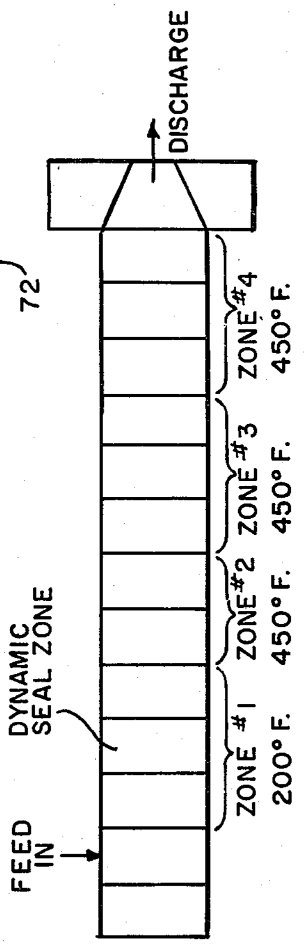
FIG. 3 is a schematic representation of the heat zones in the apparatus of the present invention.

Thermal configuration as shown in FIG. 3.

Discharge valve: 2" ball valve shown in FIG. 4 with a pressure setting of 420 psi.

In accordance with the present invention, the process parameters of the invention can vary within a wide degree as is set forth hereinafter.

The feed material for wet feeds, can have a consistency of 5% to 50% slurry with a limited viscosity and any cellulose containing material such as paper pulp, wood pulp, waste pulp, etc. can be used.

The feed rate can vary from 100 pounds per hour to 900 pounds per hour depending upon the consistency of the feed material and the RPM of the screw elements.

The reaction temperature can vary from 350° F. to 545° F. at 1000 psi, and may also be higher depending upon the available steam pressure and the ability to discharge quickly. Alternate energy transfer modes are possible such as superheated steam or water or direct heat.

The reaction pressure can vary from 135 to 1000 psi or higher depending upon the available steam pressure and the ability to discharge quickly.

The acid concentration for the process can be from 0 to 10% acid injection at rates of from 0 to 300 pounds per hour. Alternative acids for producing derivatives of fibrous materials such as cellulose can be HCL, HNO3, organic acids, $SO_2$ gas, etc.

The screw machine RPM can vary from 40 RPM to 300 PRM. The torque varies from 20% to 100% resulting from the screw RPM, the feed rate, the consistency of feed, the screw configuration, the temperature profile, acid rate of injection, conversion rate and discharge rate.

The glucose conversion depends on all of the parameters noted above such as residence time, acid concentration, temperature, mixing which all depend on the machine parameters and can vary from 5% to 90% of the theoretical conversion maximum.

The composition in the reaction zone will vary with the feed and the product composition also varies with the feed and the reaction conditions.

With respect to the screw configuration, the forward conveying preheating zone 22a can be any combination of right handed elements up to 2000 mm in length with 30, 45, 60 or 90 mm pitch elements. Also included therein can be mixing, pulverizing, kneading, etc. elements to provide a homogeneous material to the dynamic seal zone 25. The dynamic seal zone which forms the dynamic plug can be from 15 to 360 mm can comprise 30, 45, 60 or 90 mm lefthanded pitch elements with the unthreaded element constituting a portion of or the entire plug zone and thus can be from 15 to 360 mm in length. The unthreaded cylindrical spacer elements are radially recessed to the extent that they have no screw flights.

The screw configuration in the reaction zone comprises the righthanded forward conveying elements which is up to 2000 mm in length and includes 30, 45, 60 or 90 mm pitch right handed elements.

The thermal configuration is such that all of the zones 2–4 is interchangable and can vary in length from 1 to 3 barrel sections. The preheat zone temperature can vary from 32° to 212° F. and the reaction zone temperatures can vary from 350° to 545° F.

The discharge parameters result from variations in the spring compression pressure and the flow rate results in unrestricted flow for the entire reaction pressure range in the reaction zone.

The apparatus and process of the present invention is capable of handling variations in the feed rate to handle both wet and dry feed, from 5 to 100% solids. The feed rate range is from 20 pounds per hour to 150 pounds per hour of sawdust, corn-stover wheat straw, wood chips, MSW, etc.

Depending upon the feed type, that is especially for dry feed such as saw dust, injection of water before the plug zone at a rate of from 0 to 300 pounds per hour aids in plug formation. Other additives may be used to aid in plug formations such as polypropylene, oils, dewatering from previous batches so as to control torque and reduce wear. When water is injected, it may be injected in the zone 22a forward of the plug zone wherein pretreating takes place and equivalent amount of water is added with the acid injection in the reaction zone to maintain equivalent acid concentrations in the reaction zone.

Moreover, several pretreatments for the waste feed stock, in particular for newspaper, can be used to improve the cellulose to glucose conversion yield. The most effective pretreatment found was hydropulping and/or irradiation. The irradiations are carried out at ambient temperatures and in the presence of air with an electron beam accelerator. Irradiation dosages ranging from 5 to 50 megarads can be used and the 10 megarad dosage has been found to be the most commercially effective.

Figure 7:
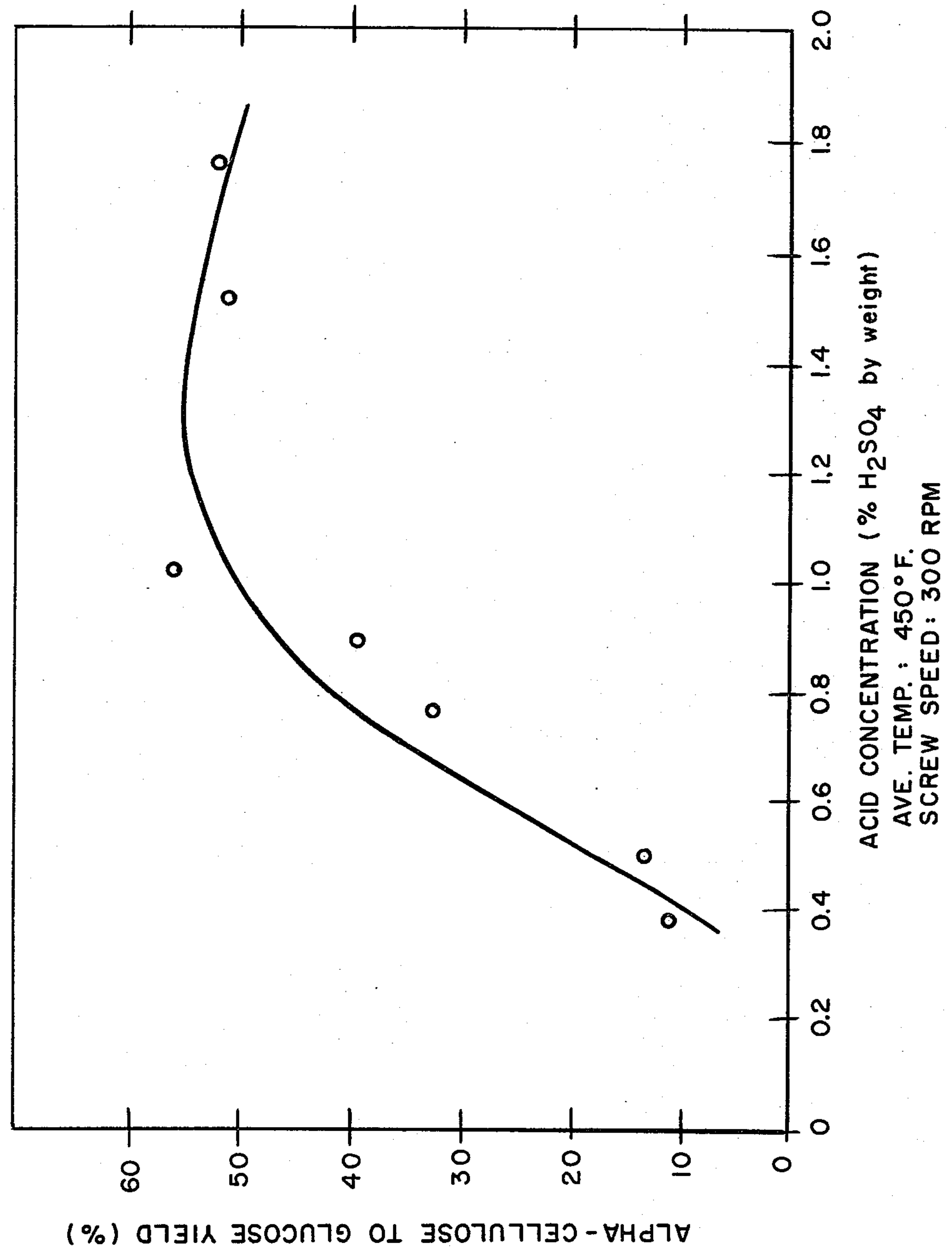
FIG. 7 is a graph of yields for different process parameters according to the invention.

FIG. 7 illustrates the results obtained with various process parameters of the present invention.

It will be clear to those skilled in the art that the process and apparatus of the present invention can be adapted for use in obtaining other derivatives of cellulose as well as derivatives of other fibrous materials. For example, lignins can be extracted from cellulose by contacting a lignocellulosic slurry or pulp with calcium bisulfite liquor (1% CaO, 4% $SO_2$) @ a pH of 9.8 injected into the reaction zone and at a temperature of 180°-200° C. by way of the injection of steam into the reaction zone. A highly sulfonated lignosulfonic acid is formed rapidly which is water soluble and can be extracted from the cellulose. Lignosulfonates can be used as binders, etc. for various applications.

It will be appreciated that the instant specification and example are set forth by way of illustration and not limitation, and that various modifications and changes may be made without departing from the spirit and scope of the present invention.

What is claimed is:

1. In a process for the acid hydrolysis of waste cellulose to glucose of the type wherein waste cellulose is continuously fed into an inlet port of a twin screw extruder, the cellulose is continuously reacted in the presence of a dilute sulfuric acid catalyst at elevated temperature and pressure in the reaction zone by the continuous injection of steam or superheated water at elevated pressure downstream of the inlet port while being continuously conveyed to an outlet port of the extruder while the extruder temperature and pressure in the reaction zone is maintained by forming a dynamic seal zone at the upstream end of the reaction zone and valving at the downstream end, the improvement wherein the step of forming a dynamic seal zone at the upstream end of the reaction zone comprises providing an unthreaded and radially recessed discontinuity in the screws.

2. The process according to claim 1, wherein the discontinuity is formed by providing an unthreaded element in the dynamic seal zone having a smaller diameter than the remaining screw upstream thereof and downstream thereof in the reaction zone.

3. The process according to claim 1 or claim 2, wherein the step of valving further comprises continuously discharging the reacted material downstream of the outlet port in response to a selected pressure in the reaction zone.

4. The process according to claim 3, wherein the step of continuously feeding the cellulose waste material comprises continuously feeding a dry cellulose material into the inlet port.

5. The process according to claim 4, further comprising adding water just upstream of the dynamic seal zone.

6. The process according to claim 1, further comprising the step of pretreating the cellulose waste material by irradiation before feeding.

* * * * *